(No Model.)

J. A. BUFFER.
ICE CREAM FREEZER.

No. 447,747.

Patented Mar. 3, 1891.

Witnesses,
J. H. Lowrie
H. C. Lee.

Inventor,
John A. Buffer
By Dewey & Co.
Attys.

UNITED STATES PATENT OFFICE.

JOHN A. BUFFER, OF SAN FRANCISCO, CALIFORNIA.

ICE-CREAM FREEZER.

SPECIFICATION forming part of Letters Patent No. 447,747, dated March 3, 1891.

Application filed August 1, 1890. Serial No. 360,707. (No model.)

*To all whom it may concern:*

Be it known that I, JOHN A. BUFFER, a citizen of the United States, residing in the city and county of San Francisco, State of California, have invented an Improvement in Ice-Cream Freezers; and I hereby declare the following to be a full, clear, and exact description of the same.

My invention relates to certain improvements in ice-cream freezers.

The object is to furnish an improved automatic freezer which is simple in construction, convenient in use, effective in operation, and with very small consumption of ice, while freezing the cream equally and evenly, and retaining it in a frozen condition for a long time without further addition of ice.

It consists in the employment of a series of shallow chambers having a considerably greater length than width, and in combination with this of a perforated platform adapted to support salt, and having openings made through them through which the molds may be introduced, and adjustable covers, and certain details of construction which will be more fully described by reference to the accompanying drawings, in which—

Figure 1:
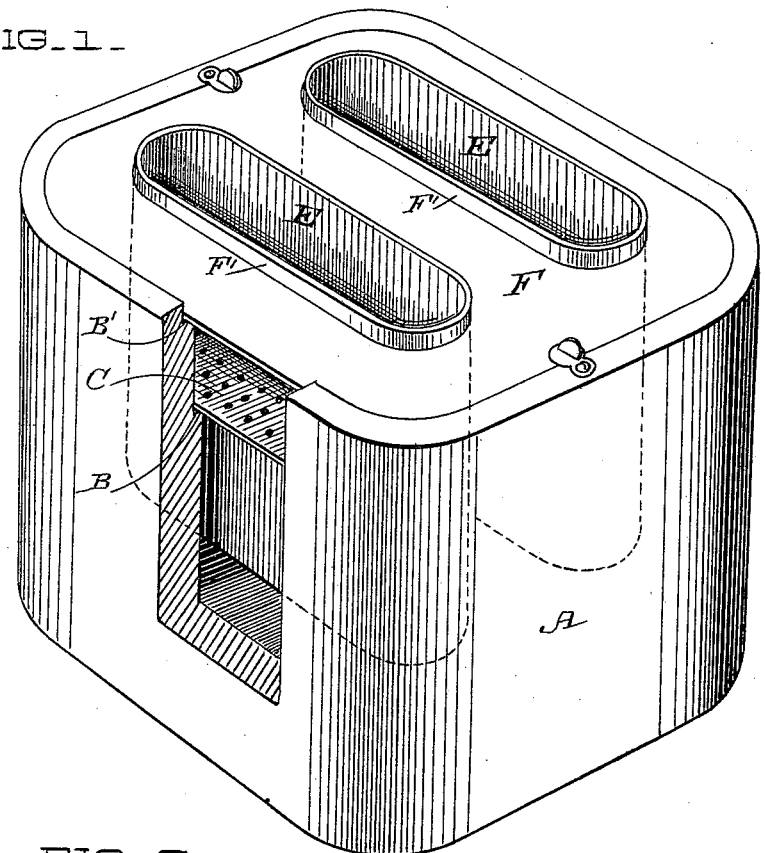
Figure 2:
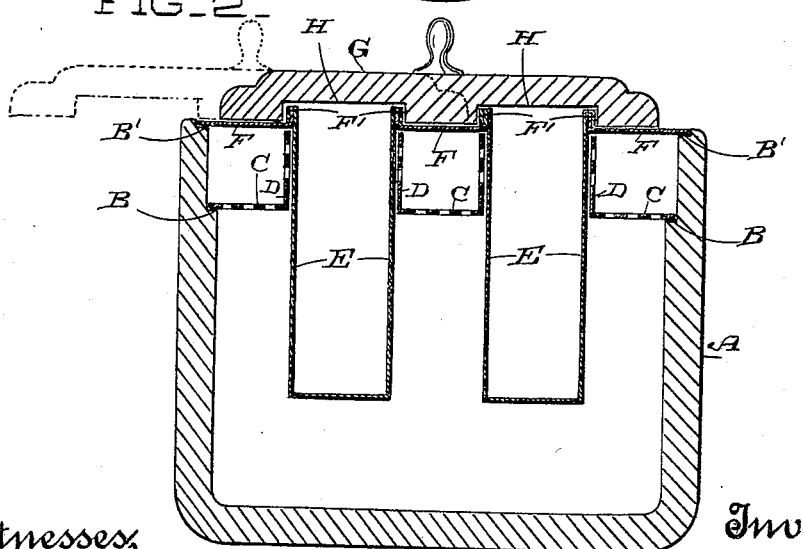

Figure 1 is a view of my freezer. Fig. 2 is a vertical section taken across the molds and outer tub.

A is an outer tub or containing-vessel, which may be made of wood, compressed fiber, or other suitable material. This tub has a ledge or shoulder, made as shown at B, upon which is supported a perforated table or platform C, made of galvanized iron or other suitable material. This platform is thus supported at a sufficient distance above the bottom and below the top of the tub, so that the salt necessary for freezing purposes may be placed upon this platform, where it will be submerged in the strong brine with which the lower part of the tub is filled. This platform has upturned flanges, as shown at D, surrounding the openings through which the molds E are introduced into the tub, the lower part of the molds passing down through these openings and remaining in the lower portion of the tub and below the perforated platform. The flanges D are perforated like the platform, and they extend up so as to abut against the plate F above.

I have shown the molds made oval in form, having a length of three or four or more diameters, and a comparatively shallow depth. This exposes a large exterior surface of the molds to the action of the freezing-mixture, and at the same time the depth from the sides to the center is so small that the whole of the contents of the molds are soon chilled through and frozen evenly from the outside to the center, the central portion being equally hard with that at the sides. By reason of this peculiar shape the cream in the molds may be easily agitated by passing the spoon through it once or twice from end to end before it has stiffened and set too much for this operation, and this is all that will be necessary during the operation of freezing. Two or more of these molds are fixed in the plate F, which is made of metal sufficiently thick to sustain the molds properly, and this plate has upturned flanges around the upper ends of the molds, as shown at F', which greatly stiffen it and make it rigid enough to support as many of the molds as it may be desired to use in one tub. These flanges are high enough to prevent anything from getting into the molds. Around the top of the tub a second ledge or shoulder B' is made, into which the edges of the plate F fit, and by which the plate and the molds are supported.

Eccentric or other suitable buttons or fasteners are fixed upon the edge of the tub, and they serve to hold the plate and molds firmly in place and prevent the parts from being floated up by the buoyancy of the ice and brine.

G is a cover, which is preferably made of wood or compressed fiber, having depressions made as shown at H, these depressions being of the same shape as the upwardly-projecting flanges F' around the mouths of the molds, and when this cover is placed over the molds it completely closes them with a non-conductor, so that the freezing of the contents of the molds will be in no way interfered with by the exterior air.

The molds are set equidistant from each other, and the depressions H in the cover being similarly formed it is manifest that whenever it is desired to obtain access to the contents of only one of the molds the cover may be shifted to one side sufficiently to expose that mold, while the others will be still protected by the cover.

In operation the lower portion of the tub is filled with pulverized ice and a small quantity of strong salt-brine, the level of the upper surface of which is above the level of the perforated platform C. This platform is filled with salt between the upturned flanges D, and this salt is dissolved by the brine below, so as to keep the latter constantly at full strenth. This platform being in place the molds are pressed down through the openings between the flanges D until the plate F rests on the shoulders B', where it is locked in place, and the cover G may then be placed over all and the apparatus left until the work is completed. During the first portion of the time and before the cream becomes stiff within the molds the cover may be removed and the contents of the molds stirred and detached from the sides by moving a knife from one end to the other two or three times, which will prevent the formation of any lumps and will equalize the temperature through the whole mass, after which it may be left until fully frozen. By this construction two or three or more kinds of cream, water-ice, ices, or other substances may be frozen at the same time without in any way interfering with the others. The contents of one or more of the molds may be taken out and a new charge put in and frozen without any change in the contents of the tub, the ice with which it is filled being sufficient to freeze two or three charges in each of the molds, if necessary, and the contents of the molds may be kept in a frozen condition for several hours without any new addition of ice.

Having thus described my invention, what I claim as new, and desire to secure by Letters Patent, is—

1. In an ice-cream freezer, a tub having a ledge or offset around its upper edge, a continuous horizontal plate the periphery of which rests upon the ledge, oval openings in the plate and correspondingly-shaped cans extending through the openings and permanently fixed therein, a second ledge or offset between this plate and the bottom of the tub, and a continuous horizontal perforated plate resting thereon with openings corresponding with the position of the cans in the upper plate, and upturned perforated flanges through which the cans are inserted or withdrawn, substantially as herein described.

2. In an ice-cream freezer, a rectangular tub with parallel ledges or offsets, as shown, a tight horizontal plate supported upon the upper ledge, a series of oval equally-spaced cans permanently fixed in openings in the plate, so as to extend above and below the plate, a perforated plate supported upon the lower ledge with flanged openings through which the lower ends of the cans pass freely, and a continuous cover with equally-spaced depressions fitting the tops of the cans, so that the cover may be moved to expose one or more of the cans and close the remainder, substantially as herein described.

In witness whereof I have hereunto set my hand.

JOHN A. BUFFER.

Witnesses:
S. H. NOURSE,
H. C. LEE.